United States Patent
Lee

(10) Patent No.: US 7,311,408 B2
(45) Date of Patent: Dec. 25, 2007

(54) ADJUSTABLE REAR VIEW MIRROR STRUCTURE

(76) Inventor: Kun-Ta Lee, 5F, No. 3, Lane 270, Pei Shen Rd., Sec. 3, Shen Keng Hsiang, Taipei Hsien (TW) 222

( * ) Notice: Subject to any disclaimer, the term of this patent is extended or adjusted under 35 U.S.C. 154(b) by 0 days.

(21) Appl. No.: 11/535,506

(22) Filed: Sep. 27, 2006

(65) Prior Publication Data

US 2007/0188896 A1    Aug. 16, 2007

(30) Foreign Application Priority Data

Feb. 10, 2006   (TW) ................. 95104642 A

(51) Int. Cl.
*G02B 5/08* (2006.01)
*G02B 7/182* (2006.01)
*B60R 1/04* (2006.01)

(52) U.S. Cl. ............. 359/846; 359/873; 359/877
(58) Field of Classification Search ......... 359/846, 359/847, 872, 873, 877
See application file for complete search history.

(56) References Cited

U.S. PATENT DOCUMENTS

| 503,004 | A | * | 8/1893 | Severy ............... 359/849 |
|---|---|---|---|---|
| 1,910,119 | A | * | 5/1933 | Moats ............... 359/847 |
| 1,986,033 | A | * | 1/1935 | Trufant ............. 359/846 |
| 2,664,785 | A | * | 1/1954 | Roehrig ............ 248/487 |
| 3,004,472 | A | * | 10/1961 | Buxton ............ 359/846 |
| 3,832,039 | A | * | 8/1974 | Doolittle .......... 359/846 |
| 4,118,879 | A | * | 10/1978 | Simon ............... 40/437 |
| 4,196,972 | A | * | 4/1980 | Rawlings .......... 359/849 |
| 4,280,753 | A | * | 7/1981 | Neubauer ......... 359/846 |
| 4,575,200 | A | * | 3/1986 | Humiston ......... 359/849 |
| 5,052,792 | A | * | 10/1991 | McDonough ..... 359/843 |
| 5,900,996 | A | * | 5/1999 | Zadro ................ 359/846 |
| 6,219,082 | B1 | * | 4/2001 | Rumsey et al. .... 347/242 |
| 6,317,229 | B1 | * | 11/2001 | Otterson ........... 359/871 |

* cited by examiner

*Primary Examiner*—Ricky D. Shafer
(74) *Attorney, Agent, or Firm*—Thomas, Kayden, Horstemeyer & Risley

(57) ABSTRACT

An adjustable rear view mirror structure is provided. The rear view mirror structure comprises a flexible body and an adjusting apparatus wherein the body has a reflective surface and an inner surface. The adjusting apparatus is disposed at a rear portion of the body and is utilized to drive the inner surface of the body. Thus, the reflective surface of the body can form a particular curvature whereby the rear view mirror structure can offer a wider viewing angle.

9 Claims, 9 Drawing Sheets

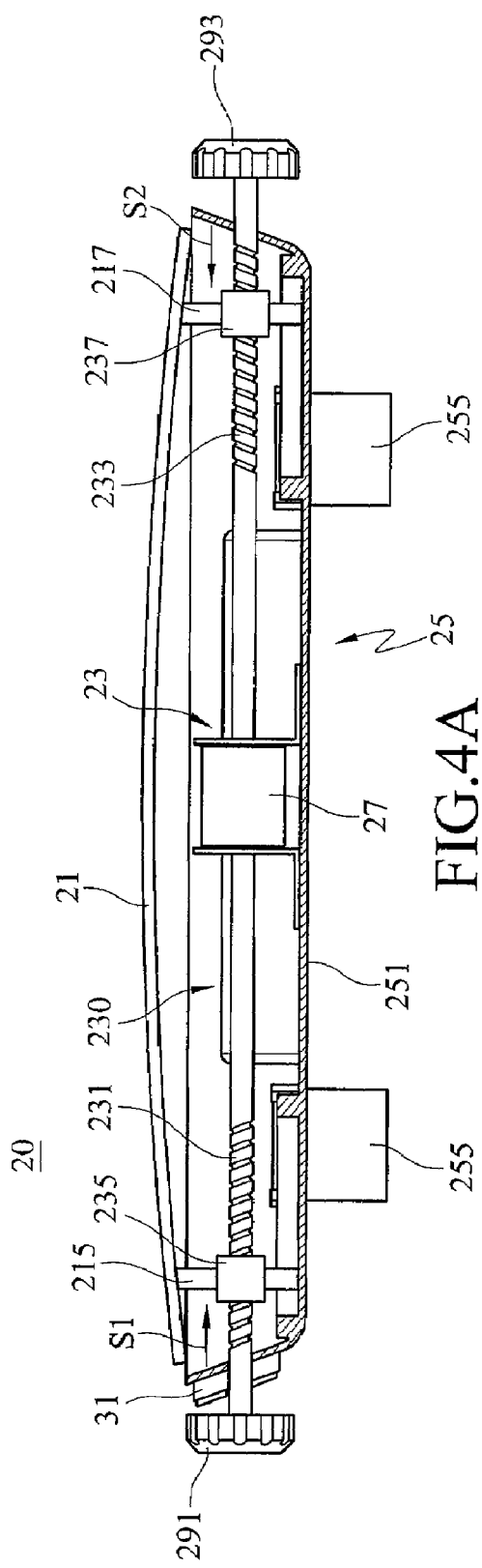
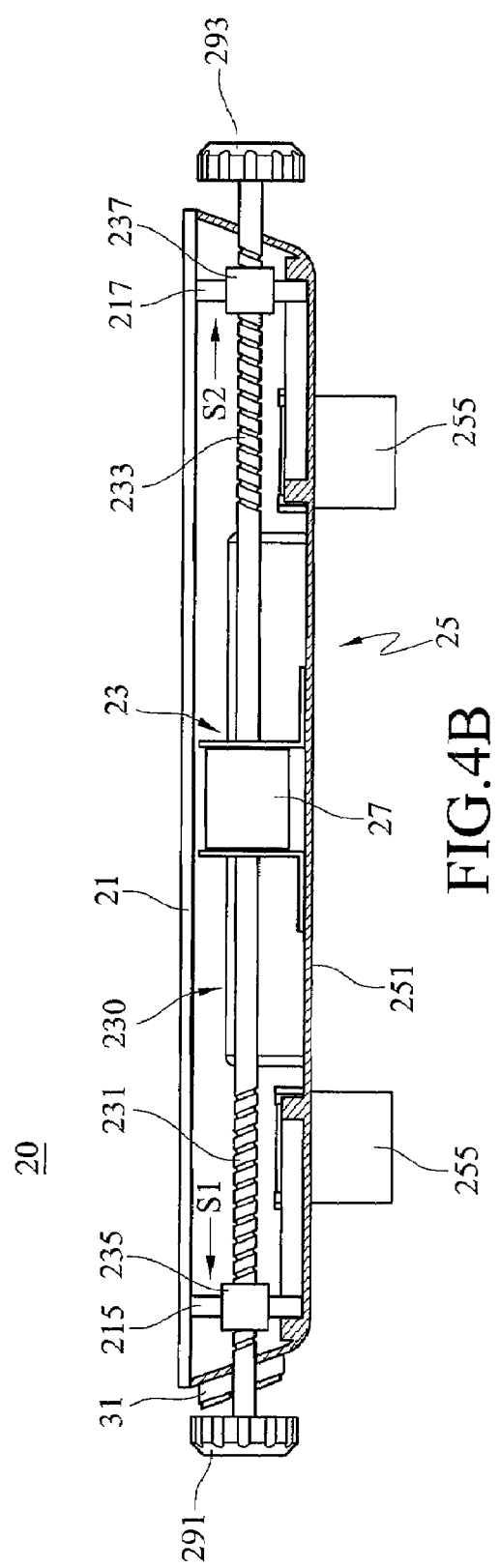

ADJUSTABLE REAR VIEW MIRROR STRUCTURE

This application claims priority to Taiwan Patent Application No. 095104642 filed on Feb. 10, 2005.

CROSS-REFERENCES TO RELATED APPLICATIONS

Not applicable.

BACKGROUND OF THE INVENTION

1. Field of the Invention

The present invention relates to an adjustable structure of a rear view mirror. In particular, the invention relates to a structure of a rear view mirror with an adjustable mirror curvature.

2. Descriptions of the Related Art

On various vehicles (such as cars, motorcycles, trucks, and etc.), the rear view mirror is a standard piece equipment. Using a car as an example, an inner rear view mirror and side rear view mirrors are usually equipped to help the driver be aware of situations behind and beside the car for increased safety during driving. However, due to the limited viewing angle of an ordinary rear view mirror, the driver encounters blind spots. To overcome this drawback, rear view mirrors with increased viewing angles are continuously presented in the market.

For example, in FIG. 1, a conventional rear view mirror 10 comprises a mirror 11 for providing a rear view visual with an ordinary viewing angle. Furthermore, a small convex reflective mirror 13 can be mounted onto the mirror 11. Since the convex reflective mirror 13 has a curvature, drivers can partially have a wide viewing angle effect. By attaching the convex mirror to an ordinary mirror, the driver benefits from the combination of the ordinary viewing angle of the mirror 11 and the wide viewing angle of the convex reflective mirror 13. As a result, the rear visuals are improved, creating a wider viewing angle with respect to cars from the side and behind for enhancing driving safety. Additionally, this mirror setup allows for a better view of the rear interior in the car in order to monitor the situations in the back-seat.

The abovementioned convex reflective mirror 13 can also be replaced by using a fixed rear view mirror with a set wide viewing angle and a large size. This fixed rear view mirror can be clipped onto the rear view mirror which has been originally equipped in the car to fully substitute the original rear view mirror.

Nevertheless, all of the current conventional designs do not simultaneously fulfill all of a user's particular requirements. Because the seat postures, heights, requirements for viewing angle, and usage habits are different between different drivers, the drivers have no choice but to use conventional rear view mirrors with certain limitations. The different habits between the drivers can not merely be fully satisfied by manually adjusting the angle of the rear view mirror 10 after the driver has entered the vehicle. Furthermore, not every driver is accustomed to the combined image (a large portion of a flat image with a small portion of a wide angle image) that is associated with the small convex reflective mirror 13 affixed to the mirror 11, as seen in the rear view mirror 10.

In addition, the adjustments on the conventional rear view mirror 10 only allow for horizontal and vertical rotation. The viewing angle of the mirror 11 is not adjustable so as to bring more limitations in use.

Given the above, a novel structure of a rear view mirror with an adjustable curvature needs to be developed in this field.

SUMMARY OF THE INVENTION

The primary objective of this invention is to provide a structure for a rear view mirror with an adjustable mirror curvature. Thus, the adjustable viewing angle can meet different driving habits and requirements for various drivers to effectively improve driving visibility and safety.

Another objective of this invention is to provide a structure for a rear view mirror with an adjustable curvature. The structure may be widely applied in various vehicles and may also provide a wide viewing angle anywhere within the vehicles.

Yet another objective of this invention is to provide a structure for a rear view mirror with an adjustable curvature. The control mechanism for adjusting the curvature can be electrically powered, manually powered, or a combination of both. Thus, the level of equipment within the car can be indirectly upgraded according to the consumer's desires.

To achieve the aforementioned objectives, the present invention provides a structure for a rear view mirror comprising a flexible body and an adjusting mechanism. The flexible body has a reflective surface and an inner surface which is opposite to the reflective surface. The adjusting mechanism is disposed at the rear portion of the body to adjustably drive the inner surface of the flexible body so that the reflective surface of the body is adapted to a specific curvature.

The detailed technology and preferred embodiments implemented for the subject invention are described in the following paragraphs accompanying the appended figures for those skilled in this field to well appreciate the features of the claimed invention.

BRIEF DESCRIPTION OF THE DRAWINGS

FIG. 4A is a cross-sectional bottom view of FIG. 2, in which the body has a curvature;

FIG. 4B is a schematic view similar to FIG. 4A but the body has no curvature;

DESCRIPTION OF THE PREFERRED EMBODIMENT

Figure 1:
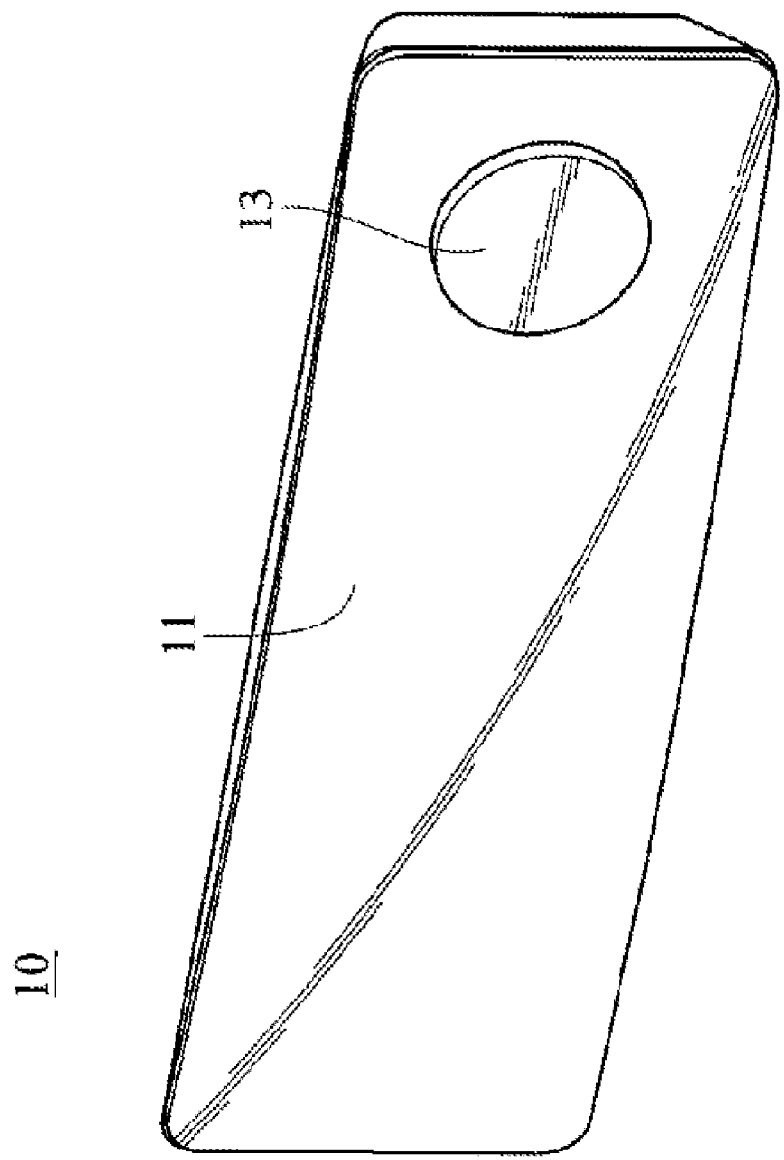
FIG. 1 is a schematic view illustrating the external of a conventional rear view mirror.
Figure 2:
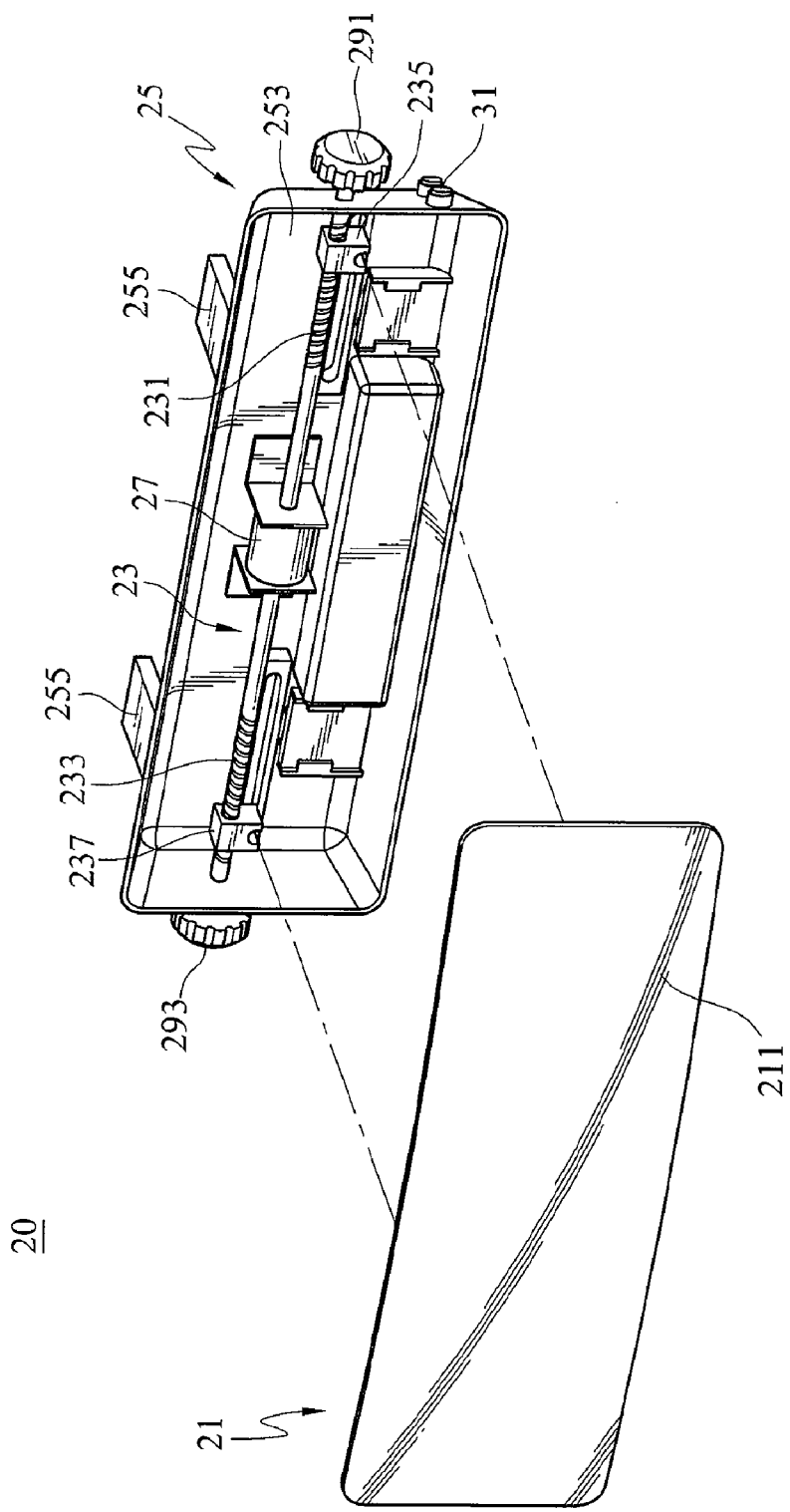
FIG. 2 is a front-decomposition schematic view illustrating a preferred embodiment of the present invention.
Figure 3:
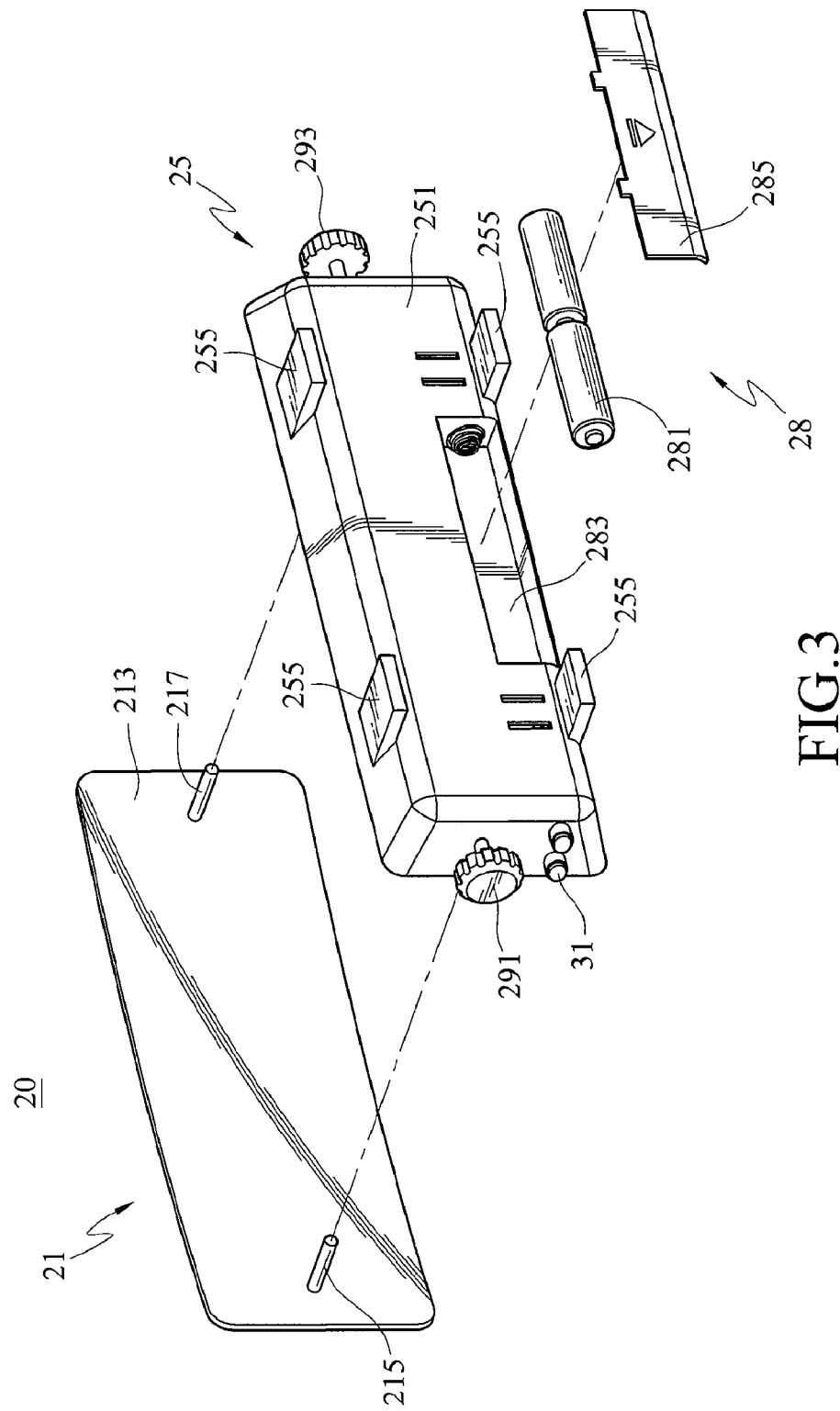
FIG. 3 is a rear-decomposition schematic view of FIG. 2.

A preferred embodiment is shown in FIG. 2 and FIG. 3. The rear view mirror structure 20 comprises a flexible body 21, an adjusting mechanism 23, and a housing 25, wherein the housing 25 has a back plate 251 and an opening 253 to define a receiving space. The body 21 is substantially disposed at the opening 253 of the housing 25 after assembly, and the adjusting mechanism 23 is disposed at the rear portion of the body 21 and within the receiving space. The body 21 has a reflective surface 211 and an inner surface 213 opposite to the reflective surface 211. The adjusting mechanism 23 is used for driving the inner surface 213 such that the reflective surface 211 of body 21 can perform a specific curvature. In addition, the housing 25 can also be selectively disposed onto other devices, such as the rear view mirror of an original vehicle accessory or other fastening components, through a plurality of protruding lugs 255.

Referring to FIG. 3, in this embodiment, the body 21 further comprises a first rod 215 and a second rod 217 which are disposed on two side areas of the inner surface 213. The first rod 215 and the second rod 217 extend backward, thus allowing the adjusting mechanism 23 to drive the first rod 215 and the second rod 217 to move relatively to adjust the curvature of the body 21.

The detailed structure of the abovementioned adjusting mechanism 23 that drives the first rod 215 and the second rod 217 is shown in FIG. 4A and FIG. 4B. The adjusting mechanism 23 further comprises an adjusting device 230, a first threaded element 235, and a second threaded element 237, wherein the first threaded element 235 and the second threaded element 237 are disposed at two sides of the receiving space, corresponding to the first rod 215 and the second rod 217 so as to engage onto the first rod 215 and the second rod 217 respectively. In addition, the adjusting device 230 has a first threaded portion 231 and a second threaded portion 233 which are oppositely formed.

Further, the first threaded portion 231 and the second threaded portion 233 are threaded within the first threaded element 235 and the second threaded element 237 respectively, in order that the first threaded element 235 is adapted to perform a first transverse movement S1 corresponding to the first threaded portion 231 and the second threaded element 237 is adapted to perform a second transverse movement S2 corresponding to the second threaded portion 233. As shown in FIG. 4A, when the first transverse movement S1 and the second transverse movement S2 face to each other, the distance between the first threaded element 235 and the second threaded element 237 is shortened. Thus the distance between the first rod 215 and the second rod 217 is also shortened gradually, driving the body 21 to bend forward and obtain an increased curvature. As shown in FIG. 4B, when the first transverse movement S1 and the second transverse movement S2 separate apart from each other, a decreasing curvature is obtained. The curvature of the body 21 is adjustable by controlling the movement direction of the first threaded element 235 and the second threaded element 237 in this embodiment.

It is noted that the manner of controlling the adjusting mechanism 23 can be electrically powered, manually powered, or a combination of both. Using electrical power as an example, the adjusting mechanism 23 can further comprise a driving device 27 for driving the adjusting device 230 to perform the first transverse movement S1 and/or the second transverse movement S2. Since the driving device 27 needs a power supply, the adjusting mechanism 23 can further comprise an electric power device 28 (as shown in FIG. 3) that is connected with the driving device 27. It is understandable that the electric power device 28 can be a direct current (DC) power supply 281, such as a battery, which is located in a battery container 283 with a cover 285 for protection.

In order to conveniently control the driving device 27 for the drivers, the adjusting mechanism 23 further comprises a switch 31 disposed on anywhere on the housing 25, or anywhere in the car, for the driver to conveniently control the electric power device 28 for supplying electric power to the driving device 27, thus to perform the curvature adjustment on the body 21. In other embodiments, the manner of controlling the adjusting mechanism 23 can also be manually powered. In this case, the adjusting device 230 further comprises a first knob 291 and a second knob 293. The first threaded portion 231 and the second threaded portion 233 protrude through two opposite side walls of the housing 25 and connect with the first knob 291 and the second knob 293 respectively. When the first knob 291 and/or the second knob 293 rotates, the aforementioned first transverse movement S1 and the mentioned second transverse movement S2 is adapted to be driven so as to alter the curvature of the body 21.

Figure 5:
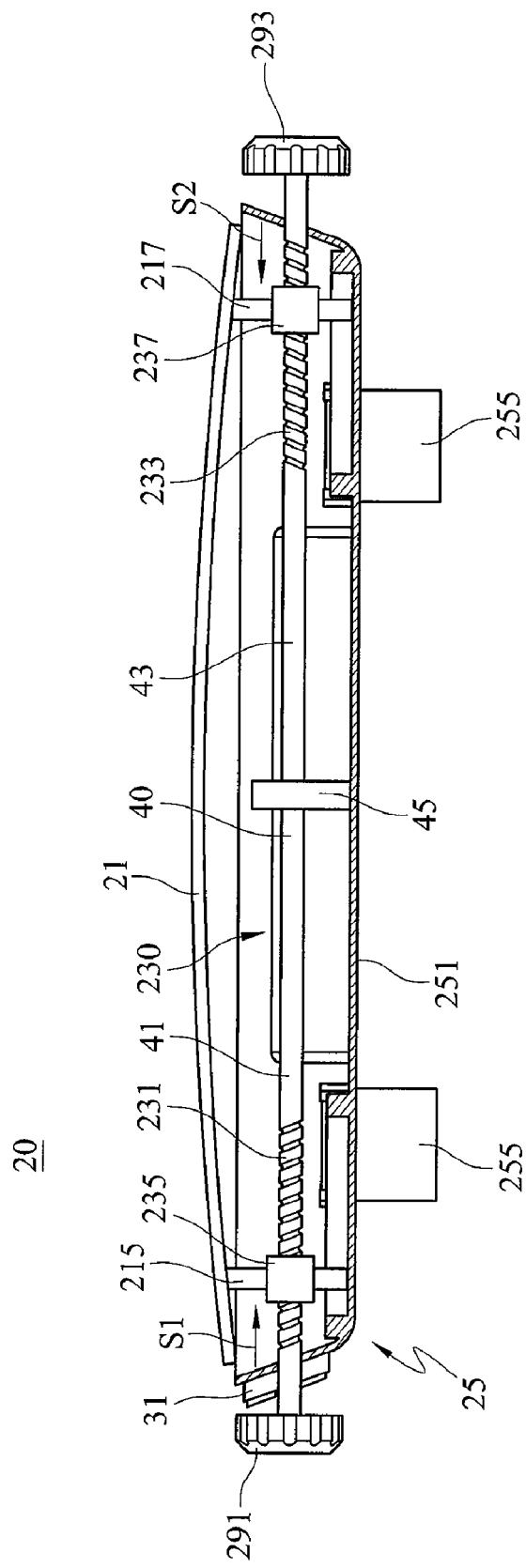
FIG. 5 is a schematic view illustrating another preferred embodiment of the control mechanism of FIG. 2.

Another preferred embodiment of the present invention is shown in FIG. 5, wherein the adjusting device 230 comprises a screw rod 40, and the aforementioned first threaded portion 231 and the second threaded portion 233 are respectively disposed on two opposite sides of the screw rod 40. In detail, the first threaded portion 231 and the second threaded portion 233 have threads that are reversed to each other. As a result of the reversed threads, the first threaded element 235 and the second threaded element 237 are driven in opposite direction when the screw rod 40 rotates in a specific direction. That is, the first threaded element 235 performs the aforesaid first transverse movement S1 and the second threaded element 237 performs the aforesaid second transverse movement S2.

The mentioned single screw rod 40 can be divided into several segments. That is, the screw rod 40 comprises a first screw rod 41 and a second screw rod 43, which are connecting with each other by a middle column 45. The aforementioned threaded portion 231 and the second threaded portion 233 are disposed on a first screw rod 41 and a second screw rod 43 respectively. In other words, the first screw rod 41 is disposed across between the middle column 45 and the side wall of the housing 25, and the second screw rod 43 is disposed between the middle column 45 and the opposite side wall of the housing 25. Similarly, when the first screw rod 41 and/or the second screw rod 43 rotates in a specific direction, the first threaded element 235 and the second threaded element 237 will be driven to perform the relative movements.

Figure 6A:
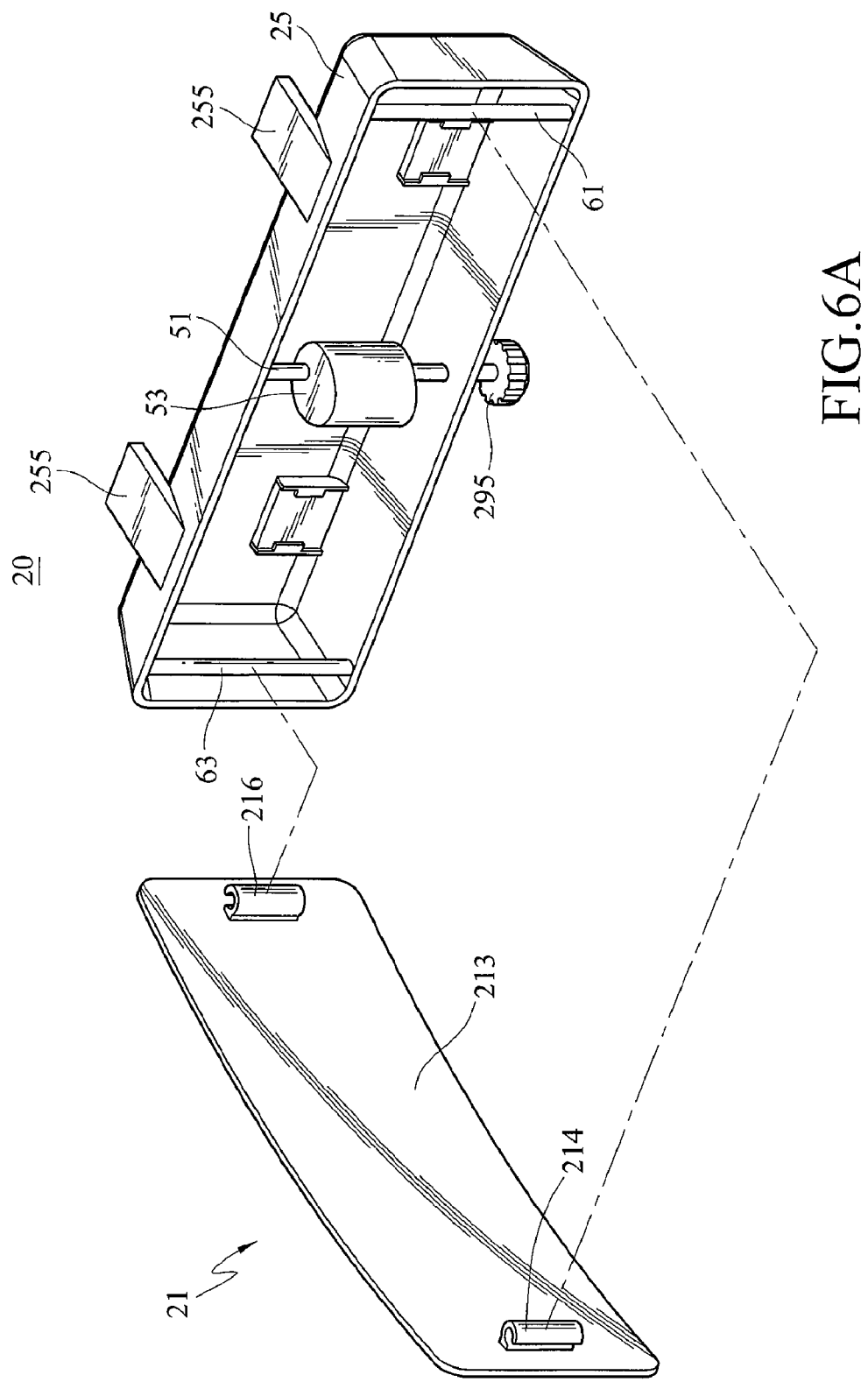
FIG. 6A is a schematic view illustrating yet another preferred embodiment of the control mechanism of the present invention.
Figure 6B:
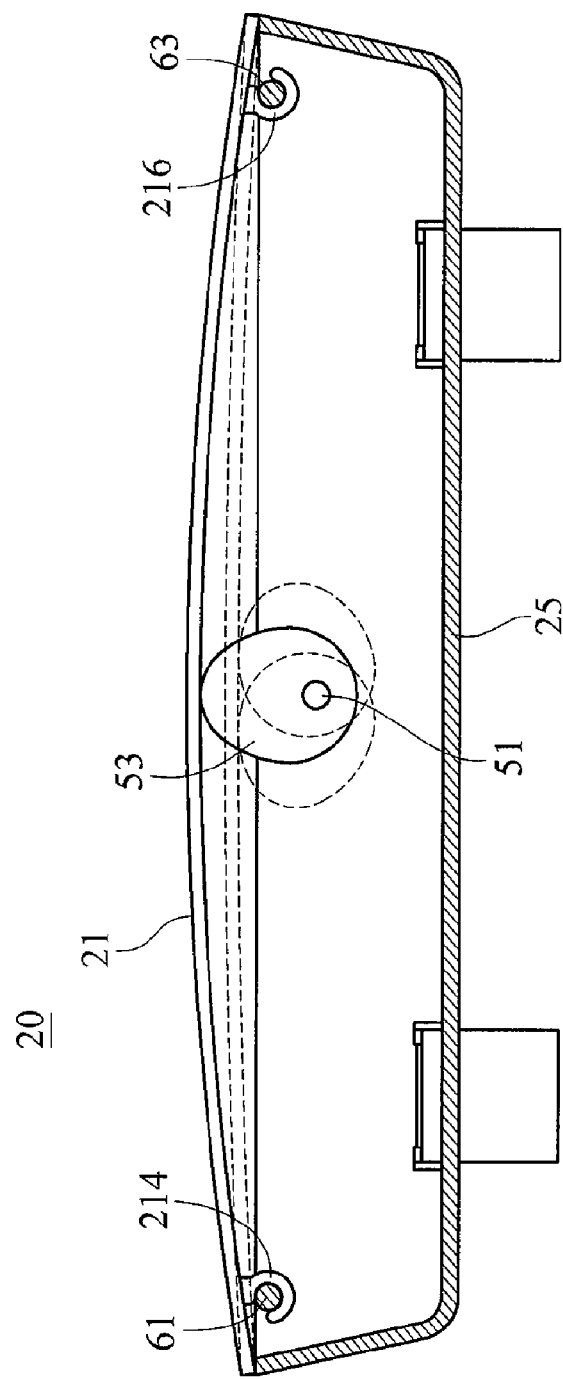
FIG. 6B is a cross-sectional bottom view of FIG. 6A, in which the body has a curvature.

The adjusting mechanism 23 of the present invention is not limited to the abovementioned solutions. As shown in FIG. 6A and FIG. 6B, the adjusting mechanism 23 can be substituted by a rotating shaft 51 and a control block 53. The rotating shaft 51 is vertically disposed in the receiving space and the control block 53 is eccentrically disposed on the rotating shaft 51, wherein an outer edge of the control block 53 is substantially in contact with the inner surface 213 of the body 21. With this eccentric design, the body 21 can be pushed to form a convex surface when the control block 53 rotates on the rotating shaft 51. For simplification, a first distance and a second distance can be defined between the outer edge of the control block 53 and the rotating shaft 51, wherein the first distance is the shortest distance between the outer edge and the rotating shaft 51, and the second distance is the greatest distance between the outer edge and the rotating shaft 51. When the distance between the rotating shaft 51 and the inner surface 213 is increasing from the first distance to the second distance, the body 21 can be pushed forward to form a variably increasing curvature. As shown in FIG. 6B, the control block 53 rotates on the rotating shaft 51 to push the inner surface 213 of the body 21.

In order to easily control the rotation of the rotating shaft 51, a knob 295 is disposed out of the housing 25 and connected to an end of the rotating shaft 51. When the knob 295 rotates, it is adapted to drive the rotating shaft 51 for rotating the control block 53. In addition, since the control block 53 substantially pushes the center of the inner surface 213 of the body 21, two sides of the body 21 need to be fastened appropriately while the curvature of the body 21 is altered. Referring to FIG. 6A and FIG. 6B again, the rear view mirror structure 20 can further comprise two columns 61 and 63 which are individually disposed vertically in the receiving space. Two fastening lugs 214, 216 are individually disposed on two sides of the inner surface 213 of the body 21, whereby the fastening lugs 214 and 216 are adapted to buckle with the columns 61, 63 to fasten the two sides of the body 213.

Figure 7:
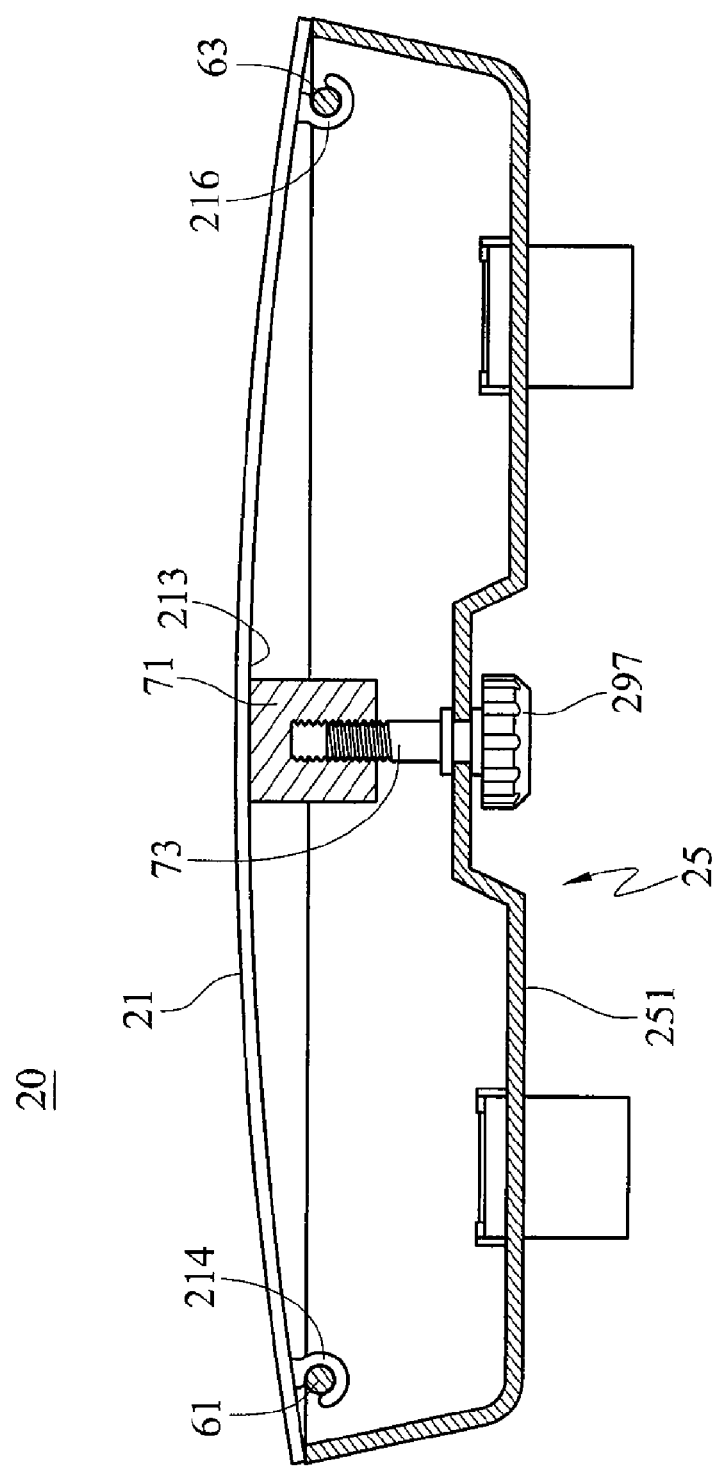
FIG. 7 is a schematic view illustrating a further preferred embodiment of the control mechanism of the present invention.

Another adjusting mechanism of the present invention is illustrated in FIG. 7. The adjusting mechanism comprises a pushing block 71, a connecting element 73, and a knob 297. The pushing block 71 pushes against the inner surface 213 of the body 21. The connecting element 73 has an end threaded with the pushing block 71 and an opposite end protruding out of the back plate 251 of the housing 25 to connect with the knob 297. When the knob 297 rotates, the knob 297 is adapted to drive the connecting element 73 and pushes against the pushing block 71 to perform a reciprocating motion. Similarly, two fastening lugs 214, 216 should be disposed on two sides of the inner surface 213 of the body 21 to buckle with the columns 61, 63 to fasten the body 21 and help facilitate the curvature forming while the pushing block 71 pushes against the center of the body 21.

Figure 8:
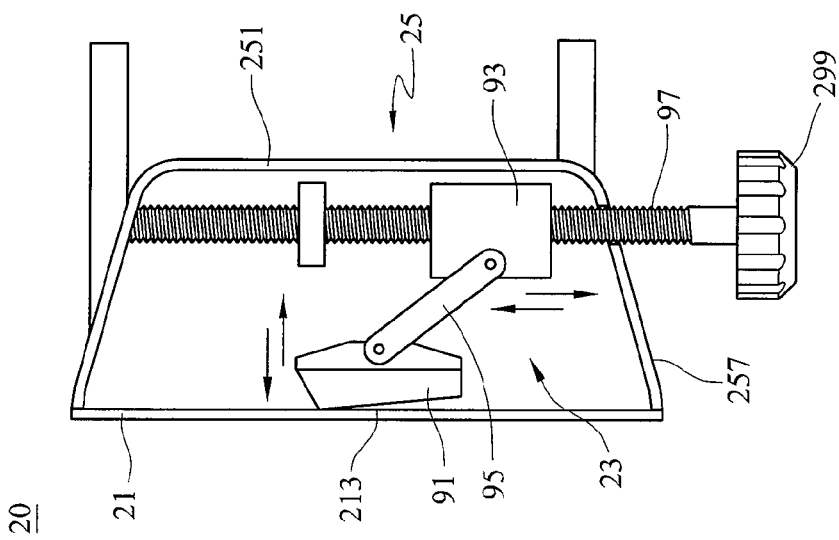
FIG. 8 is an elevational view illustrating a further preferred embodiment of the present invention.

The abovementioned embodiments for adjusting the curvature of the body 21 should not be limited. As shown in FIG. 8, the adjusting mechanism 23 comprises a pushing block 91, an adjusting element 93, a linkage 95, a vertical screw rod 97, and a knob 299. An end of the vertical screw rod 97 protrudes out of the back plate 257 of the housing and connects with the knob 299, and the body of the vertical screw rod 97 is screwed within the adjusting element 93.

Figure 9:
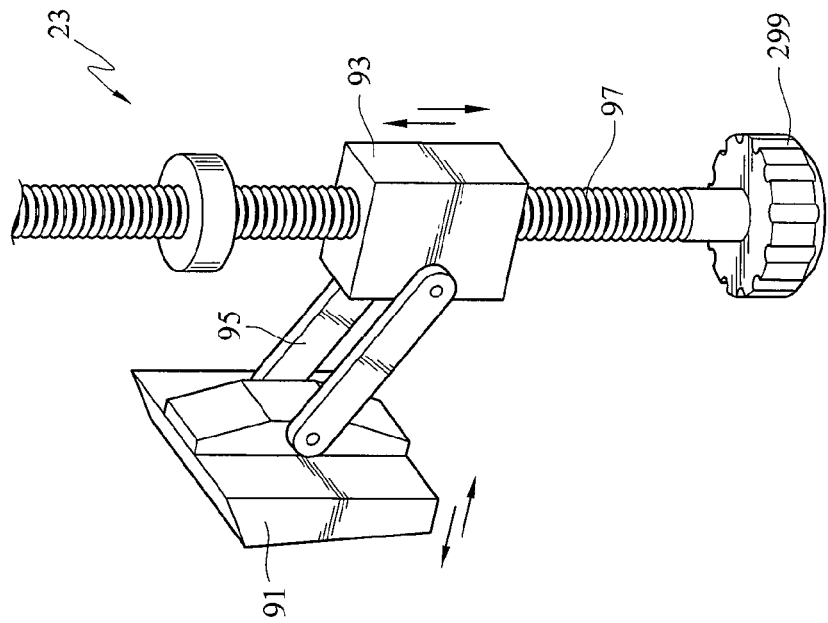
FIG. 9 is a perspective view illustrating the adjusting mechanism as shown in FIG. 8.

Further referring to FIG. 9, which is a prospective view illustrating the adjusting mechanism 23 of this embodiment, when the knob 299 rotates, the vertical screw rod 97 is adapted to drive the adjusting element 93, which is vertically disposed in the receiving space to perform an up-and-down movement from a first position to a second position. In association with the linkage 95 where one end pivots with the adjusting element 93 and the other opposite end pivots with the pushing block 91, the pushing block 91 can push against the inner surface 213 of the body 21, whereby the adjusting element driving the pushing block 91 to perform a forward movement when the adjusting element moves from the first position to the second position.

Similarly, the abovementioned two columns 61, 63 (not shown) are still disposed on two sides of the receiving space in the rear view mirror structure 20 of this embodiment. The abovementioned two fastening lugs 214, 216 are correspondingly disposed at two sides of the inner surface 213 of the body 21, whereby the fastening lugs 214, 216 are adapted to buckle with the columns 61, 63 to fasten the two sides of the body.

According to the abovementioned structure of the rear view mirror, the curvature of the body can be adjusted electrically, manually, or both. The convex surface can gain a wide viewing angle effect while the concave surface can gain a focusing effect. Thereby, it can satisfy the different driving habits of different drivers, and also help the drivers control the situation behind and besides the car to ensure safe driving.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A structure of a rear view mirror, comprising:
    a flexible body, having a reflective surface and an inner surface opposite to the reflective surface, the body further comprising a first rod and a second rod which are disposed on two sides areas of the inner surface, respectively, and extending backward;
    a housing, having a back plate and an opening, the housing defining a receiving space;
    an adjusting mechanism, disposed at a rear portion of the body, to adjustably drive the inner surface in order that the reflective surface of the body is adapted to present a specific curvature, wherein the adjusting mechanism drives the first rod and the second rod to move relatively to adjust the curvature of the body; wherein the adjusting mechanism further comprises:
        a first threaded element and a second threaded element, disposed at two sides of the receiving space and corresponding to the first rod and the second rod, respectively;
        an adjusting device, having a first threaded portion and a second threaded portion which are oppositely formed and respectively threaded within the first threaded element and the second threaded element, in order that the first threaded element is adapted to perform a first transverse movement corresponding to the first threaded portion, and the second threaded element is adapted to perform a second transverse movement corresponding to the second threaded portion, in which the first threaded element and the second threaded element engage onto the first rod and the second rod, respectively;
        when the first transverse movement and the second transverse movement face to each other, the curvature of the body is increasing, whereas when the first transverse movement and the second transverse movement separate apart from each other, the curvature of the body is decreasing.

2. The structure of a rear view mirror as claimed in claim 1, wherein the body is substantially disposed at the opening of the housing and the adjusting mechanism is substantially disposed in the receiving space.

3. The structure of a rear view mirror as claimed in claim 1, wherein the adjusting mechanism further comprises a driving device adapted to drive the adjusting device to perform at least one of the first transverse movement and the second transverse movement.

4. The structure of a rear view mirror as claimed in claim 3, wherein the adjusting mechanism further comprises an electric power device, connecting with the driving device.

5. The structure of a rear view mirror as claimed in claim 4, wherein the adjusting mechanism further comprises a switch to control the electric power device.

6. The structure of a rear view mirror as claimed in claim 4, wherein the electric power device comprises a direct current (DC) power supply.

7. The structure of a rear view mirror as claimed in claim 1, wherein the adjusting device further comprises a first knob and a second knob, and the first threaded portion and the second threaded portion of the adjusting device protrude through two opposite side walls of the housing and connect with the first knob and the second knob, respectively; when at least one of the first knob and the second knob rotates, at least one of the first and second transverse movements is adapted to be driven in order to alter the curvature of the body.

8. The structure of a rear view mirror as claimed in claim 1, wherein the adjusting device comprises a screw rod in which the first threaded portion and the second threaded portion are respectively disposed on two opposite sides thereof and have threads reversing to each other; when the screw rod rotates in a specific direction, the first transverse movement and the second transverse movement faces to each other.

9. The structure of a rear view mirror as claimed in claim 1, wherein the adjusting device comprises a first screw rod, a second screw rod, and a middle column, the first threaded portion and the second threaded portion are disposed on the first screw rod and the second screw rod, respectively, in which the first screw rod is disposed across between the middle column and a side wall of the housing, and the second screw rod is disposed across between the middle column and the other opposite side wall of the housing.

* * * * *